US005425168A

United States Patent [19]

Bumbaco et al.

[11] Patent Number: 5,425,168

[45] Date of Patent: Jun. 20, 1995

[54] TOOL APPARATUS FOR SYNCHRONIZING VALVE AND IGNITION TIMING

[75] Inventors: David Bumbaco, 3363 W. Sunset Rd., Tucson, Ariz. 85704; Randy Wahl, 5050 N. La Cholla #26, Tucson, Ariz. 85705

[73] Assignees: David Bumbaco; Randy Wahl; Frank R. Randaisi, all of Tucson, Ariz.

[21] Appl. No.: 239,904

[22] Filed: May 9, 1994

[51] Int. Cl.$^{6}$ .............................................. B23P 15/00

[52] U.S. Cl. ................................ 29/720; 29/888.011; 29/252

[58] Field of Search .................... 29/407, 888.011, 720, 29/240, 252

[56] References Cited

U.S. PATENT DOCUMENTS

| | | | |
|---|---|---|---|
| 4,593,445 | 6/1986 | Snyder et al. | 29/720 |
| 4,598,740 | 7/1986 | Sloan et al. | 29/720 |
| 4,845,818 | 7/1989 | Perry | 29/888.011 |
| 5,117,864 | 6/1992 | Byers | 29/888.011 |

*Primary Examiner*—Irene Cuda

*Attorney, Agent, or Firm*—Victor Flores

[57] ABSTRACT

A distributor installation tool for synchronizing valve and ignition timing and for priming an oil pump. The tool is formed having an elongated structure portion that is similar to a gasoline internal combustion engine'-distributor shaft and having a head structure that facilitates rotational engine mounting and which provides a marker portion for indicating the relative ignition firing position corresponding to a piston being at top dead center during the compression stroke. The tool finds particular application during rebuilding of an engine where the tool is installed on the engine during adjustment of the intake and exhaust valves. In this particular application, the engine's ignition firing order is tracked by the tool's marker portion during valve adjustment, and other subsequent engine crankshaft movement, prior to installation of the engine's distributor assembly. The tool's marker portion provides a precise mark for installing the distributor shaft and rotor. The tool further provides structure for operating an oil pump to pre-lubricate the engine's moving parts.

7 Claims, 4 Drawing Sheets

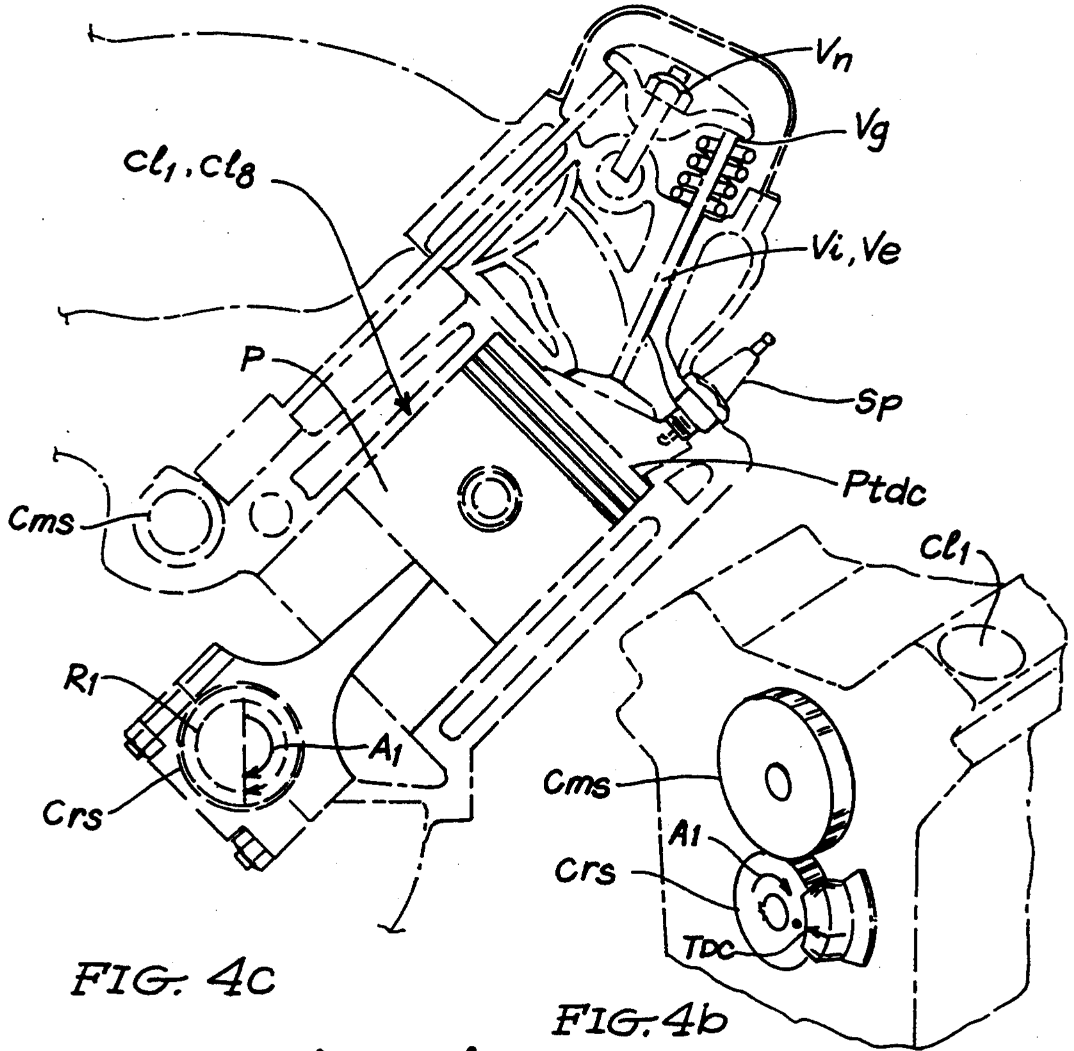
FIG. 4c
FIG. 4b
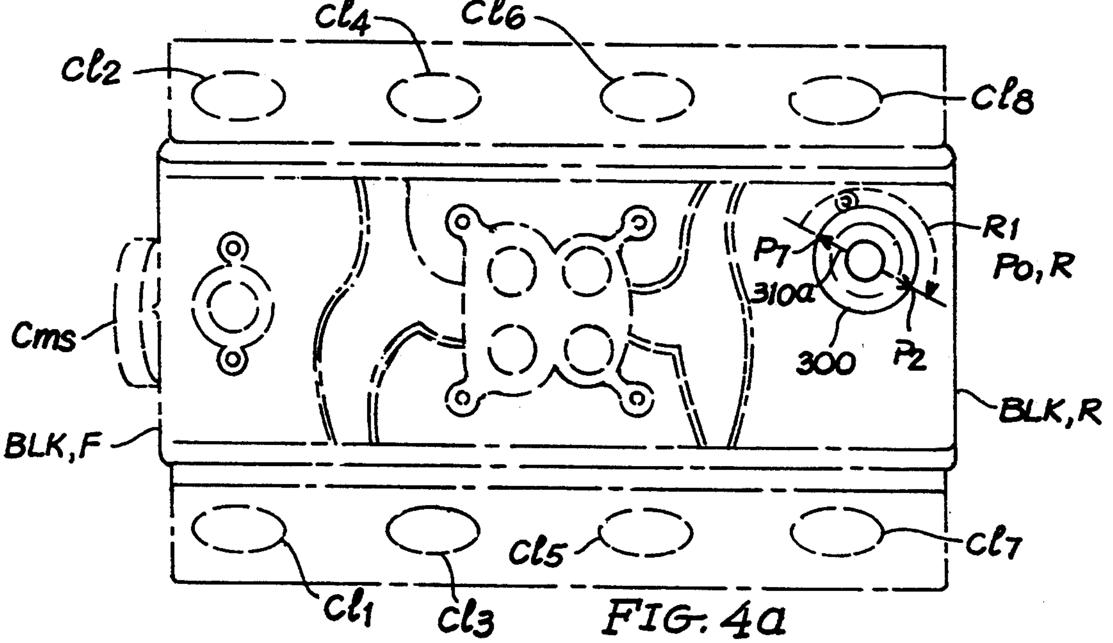
FIG. 4a

TOOL APPARATUS FOR SYNCHRONIZING VALVE AND IGNITION TIMING

FIELD OF THE INVENTION

This invention relates to tools used in the automotive industry. More particularly, the present invention relates to tools used in the automotive industry that aid in setting proper functional alignment of critical engine components. Even more particularly, the present invention relates to tools used in the automotive industry that relate to setting an engine's valve and ignition timing.

DESCRIPTION OF THE PRIOR ART

It is well known that in a gasoline internal combustion engine the intake and exhaust valves must be set to open and close in a synchronous relationship with the ignition timing according to the firing order established by the manufacturer of a particular engine. The prior art teaches that the valve gap adjustments, hence the setting for valve opening and closing, relate to the relative position of the piston in the cylinder and the corresponding position of the distributor rotor that facilitates ignition firing for that piston. For example, during rebuilding of an engine, a typical valve adjustment begins by setting piston number one at top dead center on the compression stroke, as visually aided by the timing mark on the crank shaft damper and the timing plate. The intake and exhaust valves associated with number one piston, and other valves, as specified by the manufacturer, are adjusted. At this point in the adjustment, it is known that the ignition firing position associated with the number one piston is at a particular clock hour location, but since the distributor shaft and rotor are not installed, there is no visual way of tracking the rotational positioning of the ignition timing that corresponds with subsequent positioning of another piston at top dead center on a compression stroke for subsequent adjustment of the remaining valves. Thus, although the intake and exhaust valves are adjusted on the rebuilt engine, there is no indication as to the proper clock hour installation position for the distributor shaft, and the associated distributor rotor, to assure proper firing and immediate start-up of the engine. The consequences are typically expressed by multiple engine backfiring during engine start-up and requires correcting by synchronizing the distributor shaft and rotor firing position that corresponds to the piston firing order, as specified by the manufacturer of the engine.

An additional problem associated with rebuilding of an engine is that substantially bare metal contact is experienced on moving parts during the various adjustments done during the engine rebuilding process. Lubrication of these moving part does not occur until the distributor shaft is installed to drive an oil pump.

Therefore, a need is seen for a tool for use during rebuilding of a gasoline internal combustion engine, or similar application, that functions as an installation marker for properly installing a distributor shaft and rotor to assure correct piston firing order subsequent to the engine rebuilding process.

A further need is seen for a tool for use during rebuilding of a gasoline internal combustion engine, or similar application, that not only functions as an installation marker for properly installing a distributor shaft and rotor to assure correct piston firing order subsequent to the engine rebuilding process, but that also functions as a tool for facilitating lubrication of the engine moving parts during the rebuilding process.

SUMMARY OF THE INVENTION

Accordingly, the primary object of the present invention is to provide a tool for use during rebuilding of a gasoline internal combustion engine, or similar application, that functions as an installation marker for properly installing a distributor shaft and rotor to assure correct piston firing order subsequent to the engine rebuilding process.

A further object of the present invention is to provide a tool that not only satisfies the foregoing primary object, but to provide a tool that also facilitates lubrication of the engine moving parts during the rebuilding process.

The foregoing objects are provided by a distributor installation tool formed having an elongated structure portion that is similar to a gasoline internal combustion engine's distributor shaft and having a head structure that facilitates rotational engine mounting and which provides a marker portion for indicating the relative ignition firing position corresponding to a piston being at top dead center during the compression stroke. The tool finds particular application during rebuilding of an engine whereby the tool is installed on the engine during adjustment of the intake and exhaust valves. In this particular application, the engine's ignition firing order is tracked by the tool's marker portion during valve adjustment, and other subsequent engine crankshaft, prior to installation of the engine's distributor shaft and rotor. The tool's marker portion provides a precise mark for installing the distributor shaft and rotor upon removing the tool from the rebuilt engine. The tool further provides structure for accommodating an oil pump priming feature comprising an oil pump drive shaft and a flexible drive attachment.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating two of the various ways in which the invention may be practiced.

FIG. **4*a*** is a top view of an engine shown with the timing tool installed also showing the rotational action involved during valve timing and relative positioning of the distributor rotor marker.

FIG. **4*b*** is a front view of an engine showing the initial setting of number one piston at top dead center on a compression stroke associated with using the tool of the present invention for setting valve timing.

FIG. 4*c* is a cutaway view of a cylinder and piston arrangement at top dead center on a compression stroke and further showing the valve and valve gap adjustment arrangement, also associated with using the tool of the present invention during setting of valve timing.

Figure 5A:
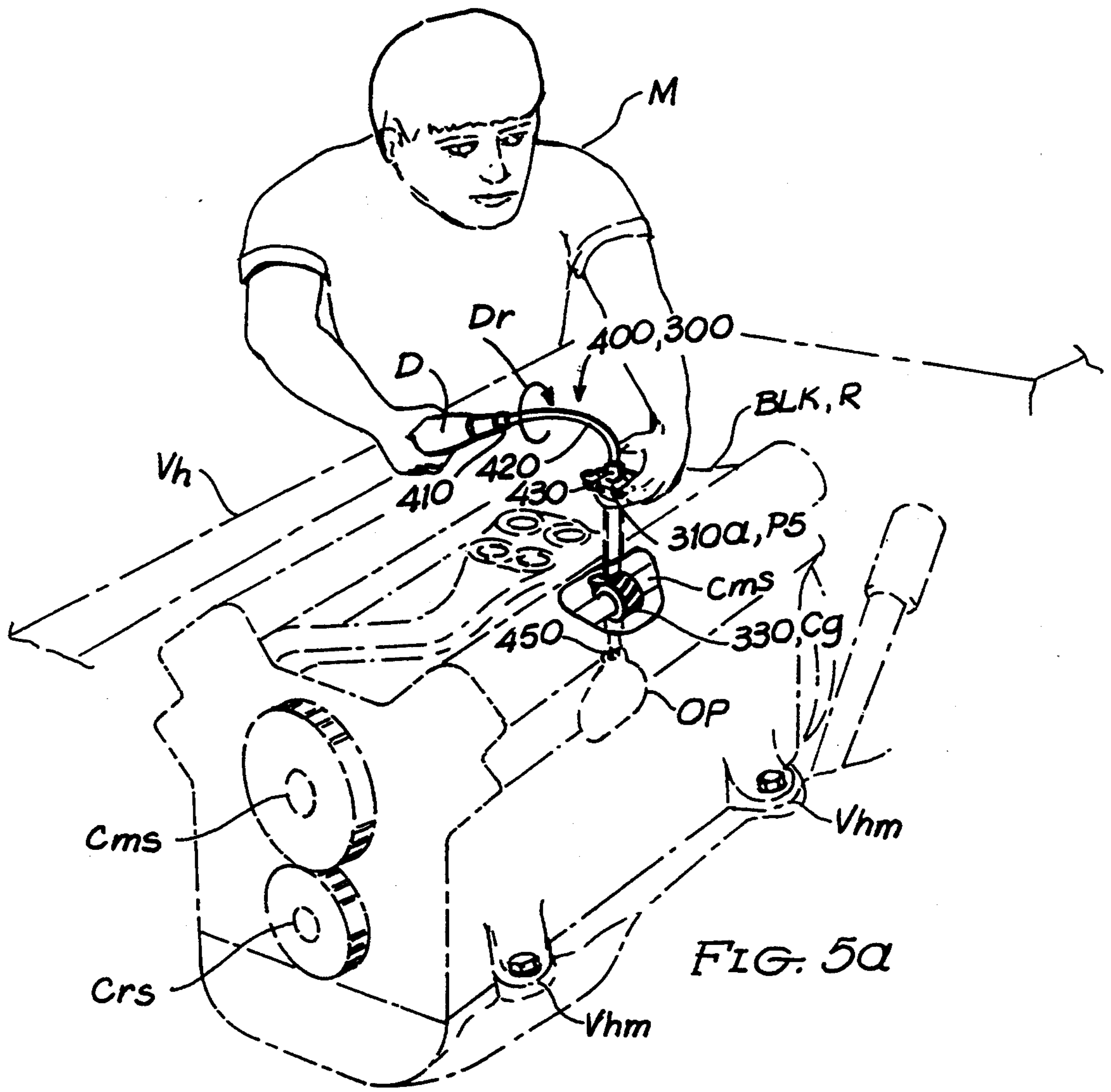

FIG. 5*a* is perspective view of an installed engine showing the oil pump priming feature of the present invention being utilized by a mechanic operating a drive means that drives the oil pump drive shaft.

Figure 5B:
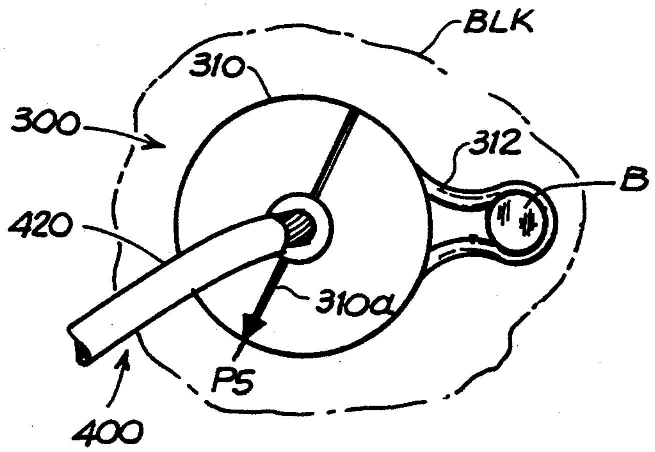

FIG. 5*b* is a top view of the head end portion of the tool after valve and ignition timing and the oil pump priming have been completed, shown to depict a final position of distributor rotor marker prior to installation of a distributor shaft.

Figure 6A:
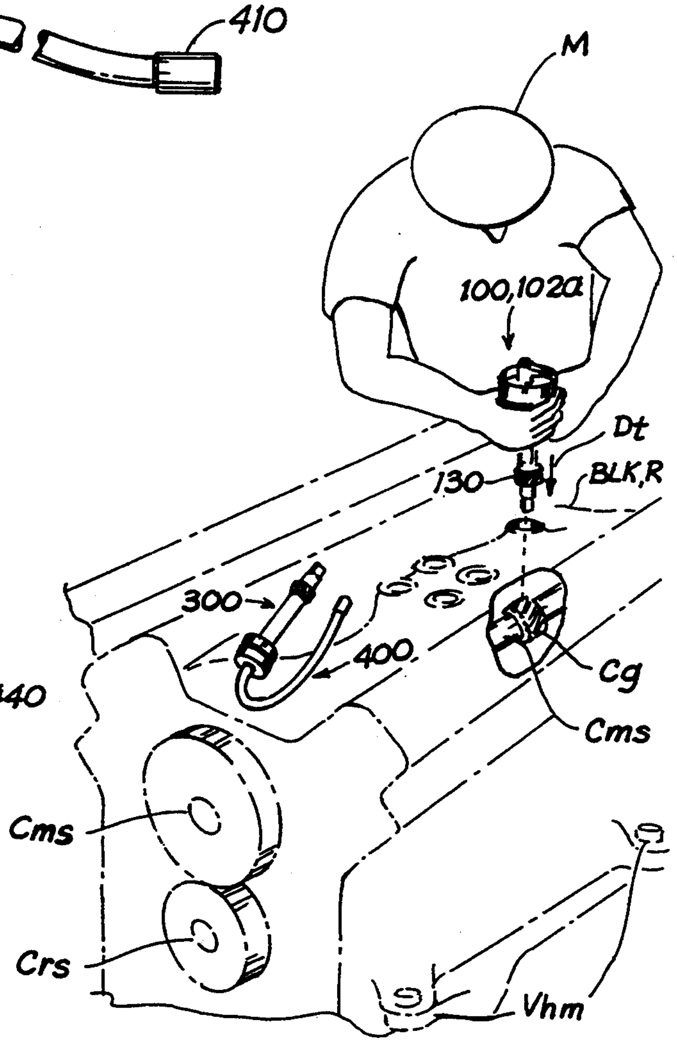

FIG. 6*a* is a view showing the timing tool removed and a distributor assembly being installed.

Figure 6B:
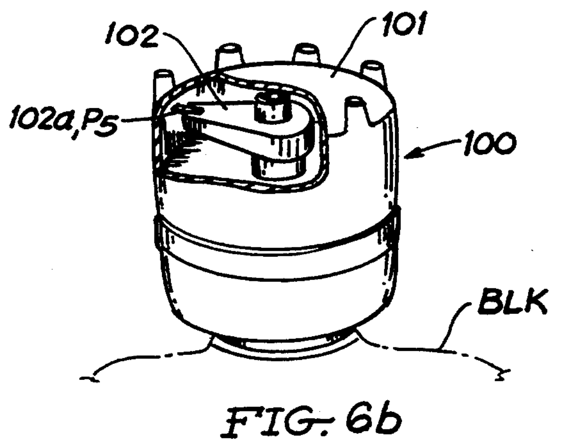

FIG. 6*b* shows the distributor rotor installed to match the final position of the distributor rotor marker as depicted in FIG. 5*b*.

DESCRIPTION OF THE PREFERRED EMBODIMENT

Figure 1:
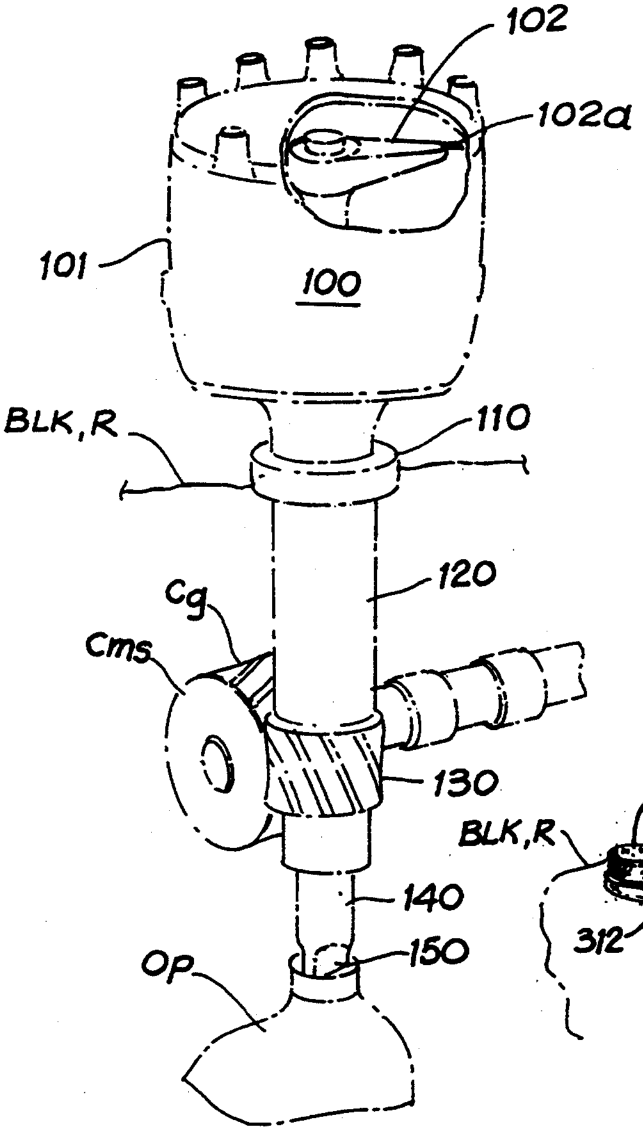
FIG. 1 is a perspective view of a typical engine's distributor shaft showing engagement to a cam shaft and also showing a cutaway view of the distributor rotor member.

FIG. 1 shows a typical engine's distributor 100 engaged to a cam shaft Cms via distributor shaft gears 130 and cam shaft gear Cg. Also as shown, distributor 100 comprises a distributor cap portion 101 including, in cutaway view, the distributor rotor member 102 and rotor pointer 102*a*. Distributor 100 is secured to an engine block BLK, typically at a rear portion R of a vehicle, via an attachment collar 110. The length of shaft portions 120, 140 may vary depending upon the particular make and model of an engine, the object being that sufficient length is provided to engage gear Cg and to engage the distally located engine oil pump OP, via a mechanical interface 150.

It is well understood that distributor 100 is a crucial component for proper function and operation of a gasoline internal combustion engine, especially in regards to maintaining the firing order of the engine's pistons and the associated setting of the intake and exhaust valves, and further, the lubrication of the engine. Unfortunately, distributor 100 does not lend itself for being a tool that can be used during rebuilding of an engine.

Figure 2:
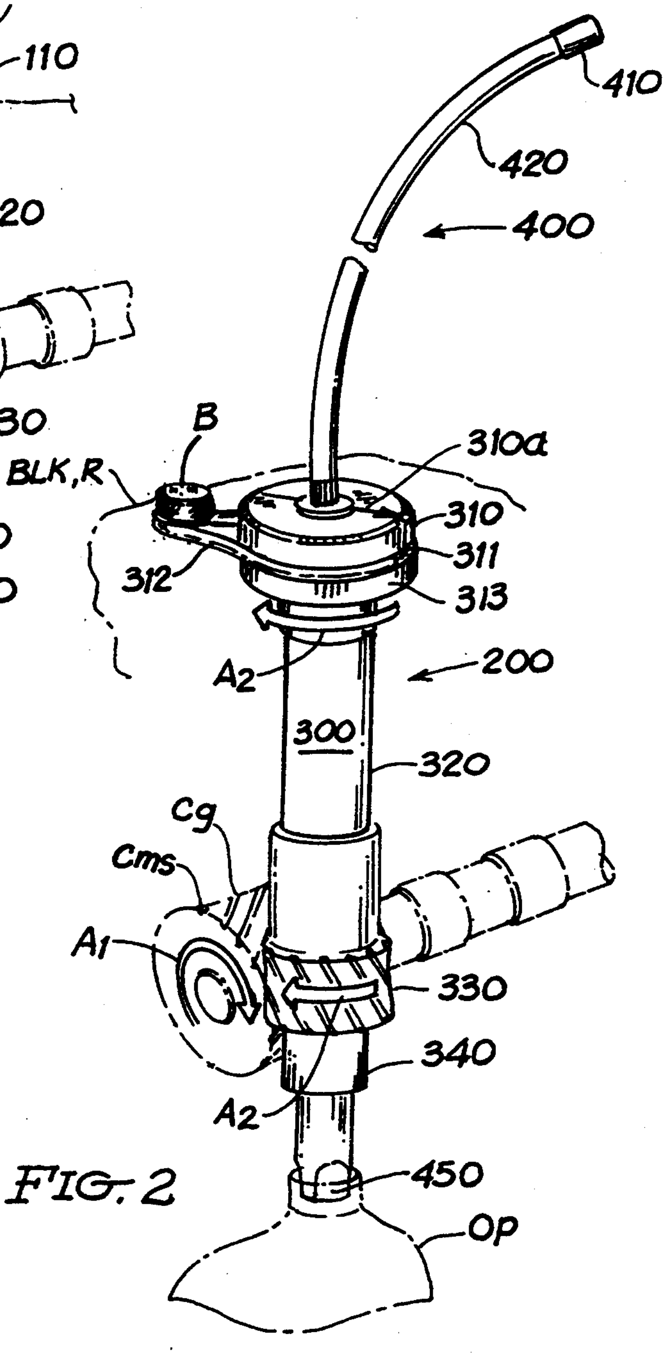
FIG. 2 is perspective view of the valve and ignition timing tool of the present invention shown installed similar to a distributor shaft shown in FIG. 1 and showing the cam shaft engagement portion and a head end portion provided with a distributor rotor marker, and further showing the oil pump priming feature.
Figure 3:
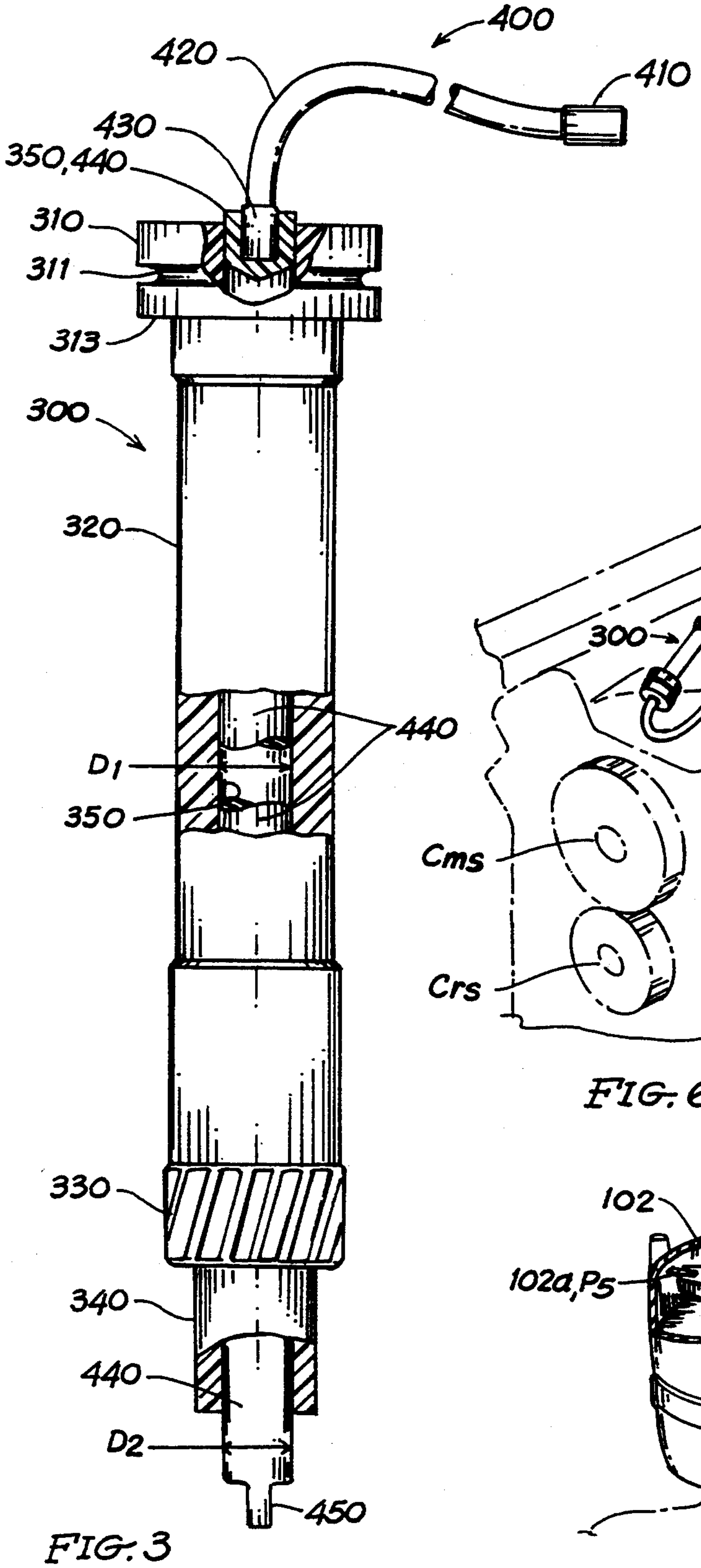
FIG. 3 is perspective view of the valve and ignition timing tool showing the structure of the cam shaft engagement portion, the head end portion, and the oil pump drive shaft and flexible drive attachment associated with the oil pump priming feature.

FIG. 2 shows the valve and ignition timing tool 200 that simulates the functions of distributor 100 for use as a tool during rebuilding of an engine. Tool 200 comprises an elongated portion 300, for use during valve setting and ignition timing, and an oil priming portion 400. As best seen in FIG. 3, tool portion 300 comprises an elongated shaft portion 320 that extends, at one end, to a cam shaft gear engagement portion 330 and that extends, at another end, to a head portion 310. Tool portion 300 further includes a distal shaft portion 340. Shaft portions 320 and 340 are formed with a bore 350 for accommodating an oil pump drive shaft 440 that is used to engage an engine's oil pump OP by means of a tapered mechanical interface portion 450. Oil pump drive shaft 440 further comprises a mechanical interface portion for engaging, by example, a flexible external drive 420 having engaging ends 410 and 430. Head portion 310 comprises a base portion 313 and a grooves portion 311 that receives a securement clamp 312 that mounts to block BLK using bolt B. The fit relationship of clamp 312 facilitates rotational slipping of tool 300 about groove 311 as a result of cranking action A1 of cam shaft Cms followed by shaft gear portion 330 as indicated by motion arrow A2. The rotating motion A2 of tool 300 is visually indicated by marker 310*a*. Still referring to FIG. 3, bore 350 is sized with a diameter D1 that is less than diameter D2 of shaft 440 to facilitate rotation Dr as shown in FIG. 5*a*.

FIG. 4*a* shows, tool portion 300 in use during rebuilding of an engine block BLK. As shown, tool portion 300 is installed in engine block BLK instead of a distributor 100. By example, block BLK is shown as having eight (8) cylinders C11–C18. The engine's cam shaft damper, shown generally as Cms, is located at a front portion F of engine block BLK. The relationship between the distributor and a respective cylinder and associated intake and exhaust valves is rooted in what is known as the firing-order. The position of the distributor rotor is shown, by example, as rotating about a 12-hour clock, with position PO at the rear R being at 12-O'clock position and position P2 being at 2:00, and position P7 being at 7:00 position. The rotational action R1 of tool portion 300 is visually indicated by marker 310*a* during valve timing and relative positioning of the pistons. FIG. 4*b* shows a front view of engine block BLK showing the initial setting of number one piston in cylinder C11 at top dead center TDC on a compression stroke, established by cranking crankshaft Crs as indicated by arrow A1 to the TDC position. FIG. 4*c* further shows, in a cutaway view, the typical cylinder C11–C18 and piston P arrangement at top dead center Ptdc on a compression stroke, readied for firing of a spark plug Sp, and further shows the typical arrangement of the intake and exhaust valves Vi, Ve and valve gap Vg adjustment point which must be manipulated during setting of the valves.

In one application, tool portion 300 would be installed in an engine block being rebuilt and set to a clock position that corresponds to the piston and valves that are to set. By example, number one piston in cylinder C11 at top dead center TDC on a compression stroke, corresponds to marker 310*a* being set at P7, see FIG. 4*a*. After setting all the valves that can be set at this P7 position, then crankshaft Crs is rotated one revolution R1, see FIG. 4*c*, to bring marker 310*a* to position P2 that corresponds to another piston being at top dead center TDC on a compression stroke. All valves that can be set at this position are then set. The process continues until all valves are set to the desired gap Vg by adjustment of nut Vn, see FIG. 4*c*. The marker 310*a* indicates where the distributor rotor pointer 102*a* must be located upon installing distributor assembly 100. Keeping tool portion 300 installed until distributor 100 is ultimately installed facilitates worry free manipulation of the crankshaft to install the engine block in a vehicle and assures engine startup with the correct firing order.

FIG. 5*a* shows engine block BLK installed in a vehicle Vh using mounting means Vhm. As illustrated, tool portion 300 is mounted and shown engaged to the camshaft Cms and assures proper subsequent installation of distributor assembly 100 using marker indicator 310*a* at a particular position, by example P5. FIG. 5*a* further show a mechanic M utilizing the oil pump priming feature of tool 200. Mechanic M operates a drive means D that drives the oil pump drive portion 400 as indicated by rotation arrow Dr to cause subsequent rotation of end 450 and operation of oil pump OP. During rotation Dr, shaft 440 rotates within bore 350. The objective of operating of oil pump OP has advantages in that the pistons and other moving parts operate in a lubricated environment from a lubricant previously provided. FIG. 5*b* is an arbitrary view of head end portion 310 of tool portion 300 after valve and ignition timing and the oil pump priming have been completed, and depict the position that distributor rotor 102*a* must point to, prior to installation of a distributor assembly 100. FIG. 6*a* show mechanic M installing distributor assembly 100 as indicated by downward arrow Dt after removing tool 200 (300, 400). FIG. 6*b* shows the orientation of distributor rotor 102*a* installed to match the final position, by example P5, as previously indicated by marker 310*a*.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. A tool apparatus for synchronizing an engine's valve and ignition timing, said apparatus comprising:
- an elongated shaft portion, said elongated shaft portion being formed having a bore, said elongated shaft portion comprising a cam shaft engagement portion at one end and a head portion at another end, said head portion having a marker member for indicating rotational positioning of said apparatus, and said head portion also having a circumferential groove;
- an oil pump drive shaft member rotatably secured in said bore; and
- a mounting clamp member, said mounting clamp member being formed having one end for securing said head portion to an engine block surface and having another end for fitting around said circumferential groove.

2. A tool apparatus as described in claim 1, wherein:
- said oil pump drive shaft member comprises a first mechanical interface for engaging an engine's oil pump and a second mechanical interface for engaging an external drive means.

3. A tool apparatus for synchronizing an engine's valve and ignition timing, said apparatus comprising:
- an elongated shaft portion, said elongated shaft portion comprising a cam shaft engagement portion at one end and a head portion at another end, said head portion having a marker member for indicating rotational positioning of said apparatus.

4. A tool apparatus as described in claim 3, wherein:
- said elongated shaft portion being formed having a central bore; and
- said apparatus further comprises an oil pump drive shaft member rotatably secured in said bore.

5. A tool apparatus as described in claim 4, wherein:
- said oil pump drive shaft member comprises a first mechanical interface for engaging an engine's oil pump and a second mechanical interface for engaging an external drive means.

6. A tool apparatus as described in claim 3, wherein:
- said head portion comprises a circumferential groove; and
- said apparatus further comprises a mounting clamp member, said mounting clamp member being formed having one end for securing said head portion to an engine block surface and having another end for fitting around said circumferential groove.

7. A tool apparatus as described in claim 6, wherein:
- said elongated shaft portion being formed having a central bore; and
- said apparatus further comprises an oil pump drive shaft member rotatably secured in said bore, said oil pump drive shaft member comprises a first mechanical interface for engaging an engine's oil pump and a second mechanical interface for engaging an external drive means.

* * * * *